United States Patent Office 3,467,733
Patented Sept. 16, 1969

3,467,733
CYCLIC ESTERS OF PHOSPHORUS AND A PROCESS FOR THE PREPARATION THEREOF
James L. Dever, Lewiston, and James J. Hodan, Williamsville, N.Y., assignors to Hooker Chemical Corporation, Niagara Falls, N.Y., a corporation of New York
Filed Nov. 26, 1965, Ser. No. 510,076
Int. Cl. C07d *105/04;* C08c *11/66;* C08f *45/58*
U.S. Cl. 260—927                    10 Claims

ABSTRACT OF THE DISCLOSURE

Cyclic phosphites and diphosphites, such as bis(1,3,2-dioxaphosphorinanyl - 2-oxy)aryl alkanes, and mono- and bis(1,3,2-dioxaphosphorinanyl-2-oxy)benzenes, useful as stabilizers for organic compositions, such as rubber and polyvinyl chloride, are made by reacting a cyclic phosphorohalidite with a hydroxy aromatic compound, subsequently neutralizing the reaction product with a nitrogen-containing compound, such as ammonia and recovering the desired cyclic phosphite or diphosphite.

---

This invention relates to a novel process for the preparation of novel cyclic phosphites and diphosphites. More particularly, the invention relates to the preparation of bis (1,3,2 - dioxaphosphorinanyl-2-oxy)aryl alkanes, and mono- and bis(1,3,2 - dioxaphosphorinanyl - 2 - oxy)benzenes.

Prior art methods for the preparation of these cyclic esters of phosphorus have been based upon the transesterification of phosphites. However, such procedures have not proven to be economical for a substantial number of the subject phosphites and diphosphites.

It is an object of this invention to provide a novel method for the preparation of cyclic esters of phosphorus. Another object is to prepare novel cyclic phosphites and diphosphites. These and other objects will become apparent to those skilled in the art from the following detailed description.

The cyclic phosphorus compounds of this invention may be characterized by the following structural formulas:

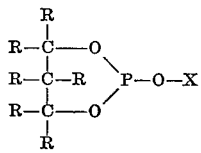

and

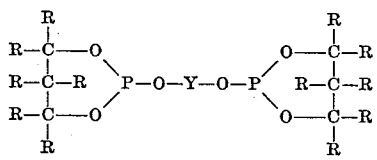

wherein X is a monovalent radical selected from the group consisting of

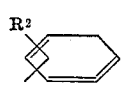  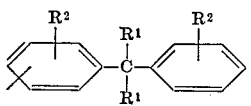

Y is a divalent radical selected from the group consisting of

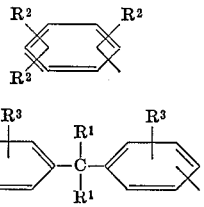

R is independently selected from the group consisting of hydrogen, alkyl of 1 to 6 carbon atoms, preferably of 1 to 4 carbon atoms, and halogen, preferably chlorine or bromine; $R^1$ is independently selected from the group consisting of hydrogen, alkyl of 1 to 12 carbon atoms, preferably from 1 to 6 carbon atoms; $R^2$ is independently selected from the group consisting of hydrogen, alkl of 1 to 12 carbon atoms, preferably of 1 to 9 carbon atoms, and halogen, preferably chlorine or bromine; and $R^3$ is independently selected from the group consisting of alkyl of 1 to 12 carbon atoms, preferably of 1 to 9 carbon atoms, and halogen, preferably chlorine or bromine.

The compound thus contains one or more 1,3,2-dioxaphosphorinanyl radicals represented and numbered as follows:

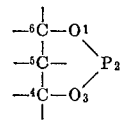

Examples of these compounds are phenyl neopentyl phosphite, also known as 5,5-dimethyl-2-phenoxy-1,3,2-dioxaphosphorinane,
methylphenyl neopentyl phosphite,
5-butyl-5-ethyl-2-phenoxy-1,3,2-dioxaphosphorinane,
5,5-dimethyl-2-(p-tertiary butyl)phenoxy-1,3,2-dioxaphosphorinane,
5,5-diethyl-2-phenoxy-1,2,2-dioxaphosphorinane,
5-butyl-5-ethyl-2-(nonyl)phenoxy-1,3,2-dioxaphosphorinane,
2-α-methylbenzylphenyl-1,3,2-dioxaphosphorinane,
4-(trifluoromethyl)-2-phenoxy-1,3,2-dioxaphosphorinane,
4-(2-bromoethyl)-2-phenoxy-1,3,2-dioxaphosphorinane,
4-(2-bromoethyl)-2-phenoxy-1,3,2-dioxaphosphorinane,
5,5-bis-(chloromethyl)-2-phenoxy-1,3,2-dioxaphosphorinane,
5,5-di(chloromethyl)-2-phenoxy-1,3,2-dioxaphosphorinane,
4,5,5-triethyl-2-phenoxy-1,3,2-dioxaphosphorinane,
5,5-dimethyl-2-(nonyl)phenoxy-1,3,2-dioxaphosphorinane,
5,5-dimethyl-2-(octyl)phenoxy-1,3,2-dioxaphosphorinane,
bis[4'-(1,3,2-dioxaphosphorinanyl-2-oxy)-phenyl]-methane,
bis 1,1-[4'-(1,3,2-dioxaphosphorinanyl-2-oxy)phenyl]-ethane,
bis 2,2-[4'-(1,3,2-dioxaphosphorinanyl-2-oxy)phenyl]-propane,
hydroquinone bis(neopentyl phosphite) also known as bis 1,4-(1,3,2-dioxaphosphorinanyl-2-oxy)benzene,
bis 1,4-(5,5-dimethyl-1,3,2-dioxaphosphorinanyl-2-oxy)-benzene,
and the like.

In accordance with the practice of the invention, the novel compounds are prepared by a process which comprises reacting a cyclic phosphorohalidite with a hydroxy organic compound, subsequently neutralizing the reaction product in the reaction mixture by adding a nitrogen-containing acid acceptor, and recovering the desired cyclic phosphorus compound. The acid acceptor is utilized to remove the halogen acid formed during the reaction.

The cyclic phosphorohalidites useful in the process of this invention have the following formula:

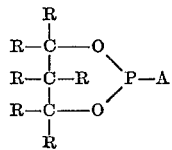

wherein R is as previously mentioned, and A is halogen, preferably chlorine or bromine. Preferred phosphorohalidites are those which have 5,5-alkyl substitution.

Examples of the phosphorohalidites suitably employed in the reaction are 5,5-dimethyl-2-chloro-1,3,2-dioxaphosphorinane,
5-ethyl-2-chloro-1,3,2-dioxaphosphorinane,
5-butyl-5-ethyl-2-chloro-1,3,2-dioxaphosphorinane,
4-ethyl-2-chloro-1,3,2-dioxaphosphorinane,
4,4-dimethyl-2-chloro-1,3,2-dioxaphosphorinane,
4,4,5-triethyl-2-chloro-1,3,2-dioxaphosphorinane,
4,5-dimethyl-2-chloro-1,3,2-dioxaphosphorinane,
4,5-diethyl-2-chloro-1,3,2-dioxaphosphorinane,
4-methyl-2-chloro-1,3,2-dioxaphosphorinane,
2-chloro-1,3,2-dioxaphosphorinane,
4,4,6-trimethyl-2-chloro-1,3,2-dioxaphosphorinane,
4-(trifluoromethyl)-2-chloro-1,3,2-dioxaphosphorinane,
5,5-bis(chloromethyl)-2-chloro-1,3,2-dioxaphosphorinane,
4-(2-chloromethyl)-2-chloro-1,3,2-dioxaphosphorinane,
4-methyl-6-methyl-2-chloro-1,3,2-dioxaphosphorinane, and the like. These compounds may be prepared by reacting the appropriate glycol with a phosphorus trihalide.

The hydroxy organic compounds which may be employed in the process of this reaction are selected from the group consisting of:

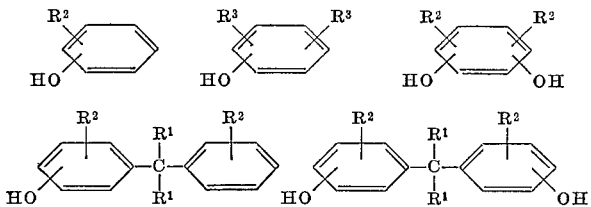

wherein $R^1$, $R^2$ and $R^3$ are as previously mentioned.

Examples of the hydroxy organic compounds, also known as phenolic compounds, are phenol, chlorophenol, hydroquinone, cresol, axylenol, chloromethylphenol, 2,5-tert-butyl phenol, 2,4-isopropyl phenol, propyl phenol, pentyl phenol, octyl phenol, nonyl phenol, 2,2-bis(4-hydroxyphenyl)propane, also known as bisphenol-A, bis(4-hydroxyphenyl)methane, also known as bisphenol-F, 2,2-bis(4 - hydroxyphenyl)butane, bis(2,4' - hydroxyphenyl) methane, 2,2 - bis(2 - hydroxyphenyl)propane, bis(3-hydroxyphenyl)methane, bis(2 - hydroxyphenyl)methane, bis(2-chloro-4-hydroxyphenyl)methane, 2,2-bis(2-bromo-4 - hydroxyphenyl)propane, bis(2-methyl-4-hydroxyphenyl)ethane, bis(2-nonyl-4-hydroxyphenyl)methane, bis(2-octyl-4-hydroxyphenyl)methane. It is preferred to employ hydroxy compounds or phenols which do not have hindered 2,6-substitution on the benzene ring.

As the nitrogen-containing compound or acid acceptor utilized to neutralize the reaction product, there may be utilized triethylamine, tributylamine, tripropylamine, pyridine, dimethylamine, and the like. The preferred compound is ammonia. If desired, a solvent such as tetrahydrofuran, ether, toluene, pentane, or the like, may be utilized.

The reaction between the cyclic phosphorohalidite and hydroxy organo compound may be effected by mixing the reactants together at room temperature, or, if necessary, by heating the mixture of reactants to moderately elevated temperatures. The reaction zone temperature, thus, may line within the range of −15 degrees centigrade to 100 degrees centigrade. The preferred temperatures are within the range of from 20 to 75 degrees centigrade. The reaction can be carried out most conveniently at atmospheric pressures. However, if preferred, pressures either higher or lower than atmospheric may be employed.

Upon completion of the reaction, the temperature of the reaction mixture is lowered to −10 to 50 degrees centigrade. It is preferred to have the nitrogen-containing compound and mixture at temperatures ranging from 0 to 15 degrees centigrade. Relative amounts of the reactants employed are not critical, although it is desirable that an excess of hydroxy compound be avoided. It is preferred that the cyclic phosphorohalidite and hydroxy organic compound be present in the reaction zone in about stoichiometric proportions.

When a molar proportion of monohydroxy organic compound is reacted, the cyclic phosphorohalidite is employed in substantially a molar proportion, and when a molar proportion of dihydroxy organic compound is reacted, substantially two molar proportions of cyclic phosphorohalidite are employed. Thus, one to two molar proportions of phosphorohalidite are generally employed, however, an excess of up to five or more molar proportions may also be utilized. The nitrogen-containing acid acceptor is added to the reaction product in substantially molar proportions based upon the quantity of cyclic phosphorohalidite utilized. However, it is within the scope of the invention to employ an excess of nitrogen-containing acid acceptor.

In conducting the reaction, the total amount of cyclic phosphorochloridite and hydroxy organic compound may be charged to a reaction vessel initially. The reaction times may vary, but generally time in the range of one to eight hours is sufficient to complete the reaction. Following this initial reaction, the nitrogen-containing acid acceptor may be introduced to the reaction vessel in any suitable manner. Most conveniently, when ammonia is used, it is charged to the reaction vessel in the form of the gas. The introduction of nitrogen-containing compound is generally completed in times ranging from one to six hours.

The reaction mixture can be worked up in any suitable manner. It is possible, for instance, to remove the solid constituents by filtration. If a solvent is employed in the reaction, it may be removed by distillation, evaporation or by any other suitable method. Because of the high yields which are in many cases obtainable, separation of the desired cyclic diphosphite, following filtration and solvent removal, is not always required for utility of the product and in such cases may be dispensed with. However, if separation is desired, techniques such as distillation, extraction, crystallization, or the like, may be employed.

The compounds of the invention find utility as stabilizers for various organic compositions, such as rubber, polyvinyl chloride, and the like.

All temperatures are in degrees centigrade and all parts are by weight, unless otherwise mentioned.

Example 1.—Preparation of phenyl neopentyl phosphite

A reaction flask was charged with 282 parts (3 molar proportions) of phenol, 506 parts (3 molar proportions) of 5,5 - dimethyl - 2 - chloro - 1,3,2 - dioxaphosphorinane, and 531 parts of dry diethyl ether. This mixture was stirred at room temperature, approximately 25 degrees centigrade, for three to four hours, cooled to 3 degrees centigrade, and 51 parts (3 molar proportions) of anhydrous ammonia was added as a gas in two hours, at 10–13 degrees centigrade using an ice bath cooling and a dry ice condenser. The reaction mixture was stirred for one hour and allowed to stand overnight. Maximum pot temperature reached was 144 degrees centigrade. The mixture was filtered and the solvent was removed from the filtrate yielding 505 parts of residue. The precipitate was extracted with 888 parts of tetrahydrofuran. Evaporation of the extract produced an additional 175 parts of residue. The residues were combined and distilled to yield 627 parts (92.4 percent conversion) of clear, colorless product having a boiling point of 84–94 degrees centigrade at 0.4–0.6 millimeters of mercury absolute pressure). Refractive index $n_D^{25}$ was 1.517–1.5160.

Example 2.—Preparation of nonylphenyl neopentyl phosphite

A reaction flask was charged with 169 parts (1 molar proportion) of 5,5 - dimethyl - 2 - chloro - 1,3,2 - dioxaphosphorinane, 220 parts (1 molar proportion) of nonylphenol, and 248 parts of diethyl ether. This mixture was stirred at room temperature, approximately 25 degrees centigrade, for three hours, followed by the addition of 17 parts (1 molar proportion) of ammonia which was allowed to distill into the reaction mixture at 10–13 degrees centigrade. After stirring for one hour the reaction mixture was filtered. The filtrate cake was extracted with tetrahydrofuran, the extract combined with the filtrate, and the solvents removed at 25–50 millimeters of mercury absolute pressure to yield 353 parts of residue (theoretical 352 parts). Distillation of the product gave 283 parts (81 percent conversion) of clear, colorless product having a boiling point of 142–149 degrees centigrade at 0.1 millimeters of mercury absolute pressure. Refractive index $n_D^{25}$ was 1.5048–1.5064.

Example 3.—Preparation of hydroquinone bisneopentyl phosphite

A reaction vessel was charged with 55 parts (0.5 molar proportions) of hydroquinone, 169 parts (1 molar proportion) of 5,5 - dimethyl - 2 - chloro - 1,3,2 - dioxaphosphorinane, and 355 parts of tetrahydrofuran. The mixture was stirred at room temperature, approximately 25 degrees centigrade, for three hours, and then 17 parts (1 molar proportion) of anhydrous ammonia was added as a vapor at 10–14 degrees centigrade using an ice bath coolant. The mixture was stirred at room temperature, approximately 25 degrees centigrade, for one hour and allowed to stand overnight. Subsequently, the mixture was filtered and the filtrate was stripped to yield 38 parts of an off-white solid having a melting point of 158–162 degrees centigrade. The filtrate cake was extracted with hot benzene to yield another 105 parts of product having a melting point of 155–160 degrees centigrade. The total conversion to cool product was 97.5 percent. One recrystallization from tetrahydrofuran gave a pure product having a melting point of 162–164 degrees centigrade.

Example 4.—Preparation of 5-butyl-5-ethyl-2-phenoxy-1,3,2-dioxaphosphorinane

A reaction flask was charged with 112 parts (0.5 molar proportions) of 5 - butyl - 5 - ethyl - 2 - chloro - 1,3,2-dioxaphosphorinane, 47 parts (0.5 molar proportions) of phenol, and 155 parts of tetrahydrofuran. This mixture was stirred at room temperature, approximately 25 degrees centigrade, for about three hours, cooled to 5 degrees centigrade, and then an excess of ammonia, at least 17 parts, was allowed to distill into the flask while the temperature of the reaction mixture was maintained at 10–20 degrees centigrade. After stirring for one hour the mixture was filtered and the solvent stripped from the filtrate to yield 141 parts (99.8 percent conversion) of colorless residue product. Distillation yielded a pure product having a boiling point of 118–128 degrees centigrade at 0.03–0.1 millimeters of mercury absolute pressure.

Example 5.—Preparation of 5,5-dimethyl-2-(p-tertiary butyl) phenoxy-1,3,2-dioxaphosphorinane To a reaction flask were charged 169 parts (1 molor proportion) of 5,5 - dimethyl - 2 - chloro - 1,3,2 - dioxaphosphorinane, 150 parts (1 molar proportion) of p-tertiary butyl phenol, and 303 parts of toluene. This mixture was then stirred at room temperature, approximately 25 degrees centigrade, for three hours. The resulting reaction mixture was then cooled to 3 degrees centigrade and 18 parts of liquid anhydrous ammonia was allowed to distill into the reaction flask in one hour at 7–13 degrees centigrade. After stirring for one hour the mixture was filtered and the solvent removed from the filtrate to yield 255 parts (90.5 percent conversion) of pale, yellow oil which completely solidified on standing. Distillation yielded a high purity product having a boiling point of 97–100 degrees centigrade at 0.05 millimeters of mercury absolute pressure. The product was a clear colorless liquid which completely solidified to a white solid.

Example 6.—Preparation of bisphenol-A bisneopentyl phosphite

A reaction flask was charged with 76 parts (0.33 molar proportions) of bisphenol-A, 112 parts (0.67 molar proportions) of 5,5 - dimethyl - 2 - chloro - 1,3,2 - dioxaphosphorinane, and 311 parts of tetrahydrofuran. The mixture was stirred at room temperature, approximately 25 degrees centigrade, for four hours, cooled to 5 degrees centigrade, and then 11 parts (0.67 molar proportions) of anhydrous ammonia was allowed to distill into the flask at 10–20 degrees centigrade over 0.7 hour. The mixture was stirred for several hours and the filtrate was stripped of solvent to a temperature of 60 degrees centigrade at one millimeter of mercury absolute pressure. The oily residue was shaken several minutes with 125 parts of pentane and as a result solidified to give a quantitative yield of white, solid product having a boiling point of 89–91.5 degrees centigrade.

Example 7.—Preparation of 5,5-diethyl-2-phenoxy-1,3,2-dioxaphosphorinane

A reaction flask was charged with 197 parts (1 molar proportion) of 5,5 - diethyl - 2 - chloro - 1,3,2 - dioxaphosphorinane, 94 parts (1 molar proportion) of phenol, and 260 parts of toluene. This mixture was stirred at room temperature, approximately 25 degrees centigrade, for four hours, cooled to 5 degrees centigrade, and then one molar proportion of ammonia was added as a gas over a period of 1.2 hours at 10–20 degrees centigrade. After stirring for one hour the mixture was filtered and the solvent removed to a final condition of 50 degrees centigrade at 10 millimeters of mercury absolute pressure yielding 247 parts (97 percent conversion) of colorless residue product. Distillation yielded a pure product having a boiling point of 130–131 degrees centigrade at 0.03 millimeters of mercury absolute pressure. The product was analyzed and found to contain carbon 61.36 percent, hydrogen 7.36 percent and phosphorus 12.5 percent. Theoretical yield for the compound having the formula $C_{13}H_{19}O_3P$ is carbon 61.40 percent, hydrogen 7.53 percent and phosphorus 12.18 percent.

Example 8.—Preparation of 5-butyl-5-ethyl-2 (nonyl)phenoxy-1,3,2-dioxaphosphorinane A reaction vessel was charged with 150 parts (0.67 molar proportions) of 5-butyl-5-ethyl-2-chloro-1,3,2-dioxaphosphorinane, 147 parts (0.67 molar proportion) of nonyl phenol and 260 parts of toluene. After stirring at room temperature, approximately 25 degrees centigrade, for four hours, 11 parts (0.67 molar proportions) of anhydrous ammonia was allowed to distill into the reaction flask over a period of one hour at 10–20 degrees centigrade. The mixture was stirred for one hour and filtered. The solvent was removed from the filtrate at final conditions of 75 degrees centigrade and one millimeter of mercury of absolute pressure yielding 268 parts (98 percent conversion) of product which was clear and colorless after filtration. The material was concentrated to 125 degrees centigrade at 0.5 millimeters of absolute pressure. The product was analyzed and found to contain carbon 70.62 percent, hydrogen 10.12 percent, phosphorus 7.46 percent, chlorine 0.11 percent and nitrogen 0.14 percent. Theoretical amount for the product $C_{24}H_{41}O_3P$ is carbon 70.60 percent, hydrogen 10.11 percent, phosphorus 7.59 percent, chlorine 0.00 percent and nitrogen 0.00 percent.

Example 9.—Preparation of 5,5-dimethyl-2-(4'-octylphenyl)-1,3,2-dioxaphosphorinane A reaction vessel was charged with 169 parts (1.0 molar proportion) of 5,5-dimethyl-2-chloro-1,3,2-dioxaphosphorinane, 206 parts (1.0 molar proportion) of octylphenol, and 346 parts of toluene. The mixture was stirred at room temperature, approximately 25 degrees centigrade, for four hours, cooled to 5 degrees centigrade, and then 17 parts of ammonia was introduced as a gas at 10–18 degrees centigrade using ice bath cooling over a period of 0.75 hour. After stirring one hour the mixture was filtered, the filtrate stripped of solvent at reduced pressure, and the residue concentrated for 1.5 hours at 70–75 degrees centigrade and 14 millimeters of mercury absolute pressure. The residue completely solidified on cooling to yield the product as a hard off-white crystalline solid in 93 percent conversion. A portion was purified by distillation to yield clear, colorless distillate having a boiling point of 138 degrees centigrade at 0.1 millimeter of mercury absolute pressue, which completely solidified on standing. The product has the structural formula:

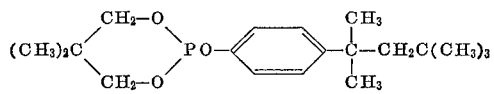

Example 10.—Preparation of 5,5-dimethyl-2-(2',4'-di-tert-butylphenyl)-1,3,2-dioxaphosphorinane A reaction vessel was charged with 118 parts (0.7 molar proportion) of 5,5-dimethyl-2-chloro-1,3,2-dioxaphosphorinane, 144 parts (0.7 molar proportion) of 2,4-di-tert-butyl phenol, and 303 parts of toluene. The resulting solution was stirred at room temperature, approximately 25 degrees centigrade, for 4.6 hours, cooled to 5 degrees centigrade, and treated with 12 parts (0.7 molar proportion) of gaseous ammonia over a period of 0.75 hour at 8–15 degrees centigrade, using ice bath cooling. After stirring for one hour the mixture was filtered, the solvent removed from the filtrate, and the residue distilled to yield 167 parts (71 percent conversion) of clear, colorless product having a boiling point of 121–135 degrees centigrade at 0.1–0.5 millimeters of mercury absolute pressure. The product has the structural formula:

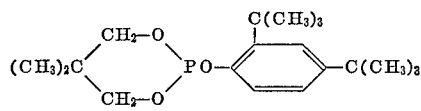

Upon replacement of 2,4-di-tert-butyl phenol in the above example by equimolar quantities of α-methylbenzyl phenol or α-ethylbenzyl phenol, the corresponding 1,3,2-dioxaphosphorinanes are obtained.

What is claimed is:
1. A cyclic phosphorus compound selected from the group consisting of

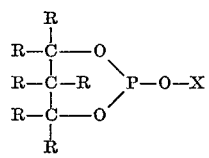

and

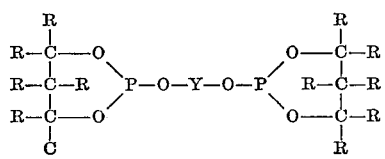

wherein X is

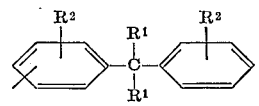

Y is a divalent radical selected from the group consisting of

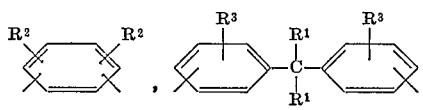

R is independently selected from the group consisting of hydrogen, alkyl of 1 to 6 carbon atoms, and bromine and chlorine; $R^1$ is independently selected from the group consisting of hydrogen, alkyl of 1 to 12 carbon atoms; $R^2$ is independently selected from the group consisting of hydrogen, alkyl of 1 to 12 carbon atoms, and bromine and chlorine; and $R^3$ is independently selected from the group consisting of alkyl of 1 to 12 carbon atoms, and chlorine and bromine.

2. A compound in accordance with claim 1 of the formula:

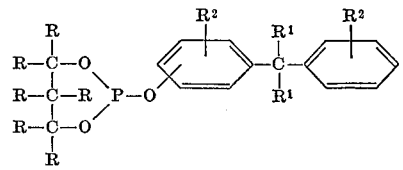

3. A compound in accordance with claim 2 of the formula:

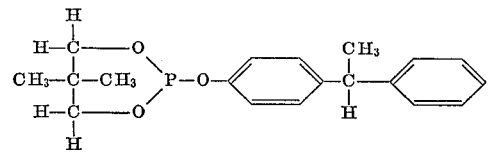

4. A compound in accordance with claim 1 of the formula:

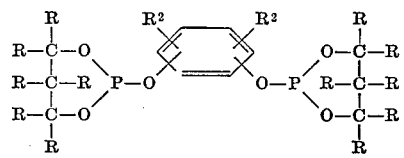

5. A compound in accordance with claim 4 of the formula:

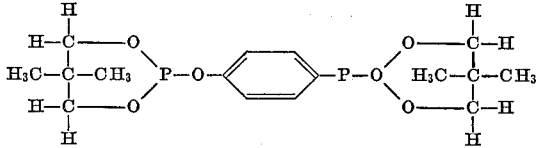

6. A compound in accordance with claim 1 of the formula:

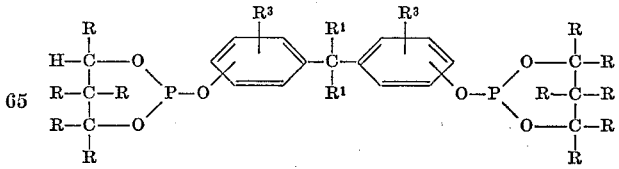

7.

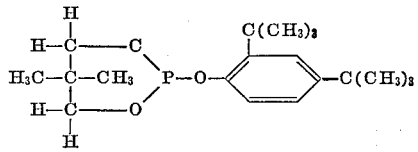

8. A process for preparing cyclic phosphorus compounds which comprises reacting at a temperature in the range of from −15 degrees centigrade to 100 degrees centigrade a phosphorochloridite of the formula:

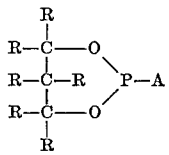

wherein R is independently selected from the group consisting of hydrogen, alkyl of 1 to 6 carbon atoms, bromine and chlorine; and A is bromine or chlorine; with a hydroxy organic compound selected from the group consisting of compounds of the formulas:

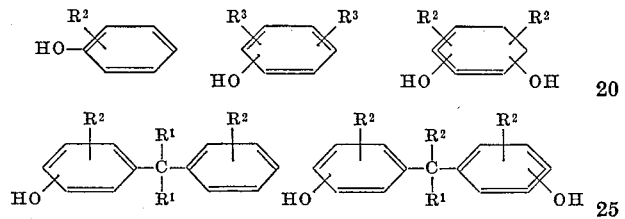

wherein $R^1$ is independently selected from the group consisting of hydrogen and alkyl of 1 to 12 carbon atoms; $R^2$ is sleected from the group consisting of hydrogen, alkyl of 1 to 12 carbon atoms, bromine and chlorine; and $R^3$ is independently selected from the group consisting of alkyl of 1 to 12 carbon atoms, bromine and chlorine, adding ammonia to the reaction mixture, after completion of the reaction, whereby the reaction product is neutralized, and recovering the desired cyclic phosphite.

9. A process in accordance with claim 8 wherein one or two molar proportions of cyclic phosphorohalidite, based on a one molar proportion of hydroxy compound, are employed and the ammonia is added from 1 to 8 hours after reacting the phosphorochloridite with the hydroxy organic compound.

10. A process in accordance with claim 9 wherein the neutralization temperature is within the range of from −10 degrees centigrade to 50 degrees centigrade.

References Cited
UNITED STATES PATENTS

| | | | |
|---|---|---|---|
| 2,841,608 | 7/1958 | Hechenbleikner | 260—937 X |
| 3,039,993 | 6/1962 | Freidman | 260—937 X |
| 3,149,181 | 9/1964 | Warren | 260—927 X |

FOREIGN PATENTS 1,384,809  11/1964  France.

CHARLES B. PARKER, Primary Examiner
R. L. RAYMOND, Assistant Examiner

U.S. Cl. X.R.

252—407; 260—937, 973

PO-1050
(5/69)

UNITED STATES PATENT OFFICE
CERTIFICATE OF CORRECTION

Patent No. 3,467,733      Dated September 16, 1969

Inventor(s)    -    James L. Dever et al.

It is certified that error appears in the above-identified patent and that said Letters Patent are hereby corrected as shown below:

Column 1, line 70, delete 3rd benzene ring in formula and insert --- 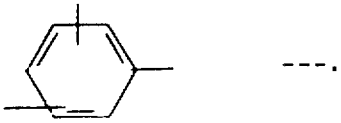 ---.

Column 2, line 5, delete first benzene ring in formula and insert ---  ---.

Column 2, line 40, delete "-1,2,2-" and insert --- -1,3,2- ---.
Claim 6, Column 8, line 64, please change formula to read

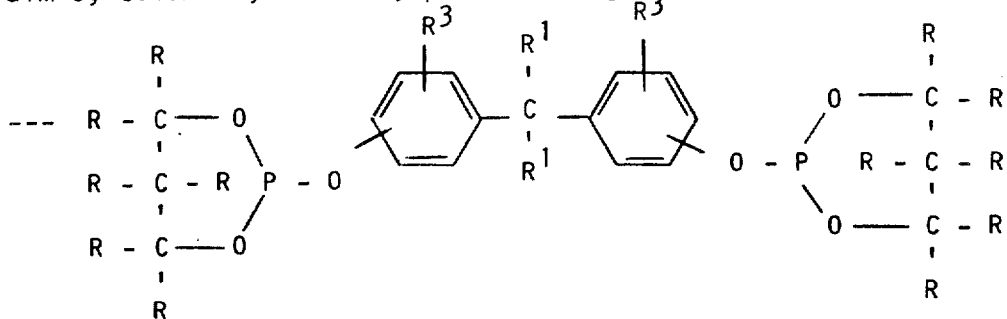

-1-

PO-1050
(5/69)

UNITED STATES PATENT OFFICE
CERTIFICATE OF CORRECTION

Patent No. 3,467,733                    Dated September 16, 1969

Inventor(s) James L. Dever et al.

It is certified that error appears in the above-identified patent and that said Letters Patent are hereby corrected as shown below:

Claim 7, Column 8, line 73, delete formula and insert

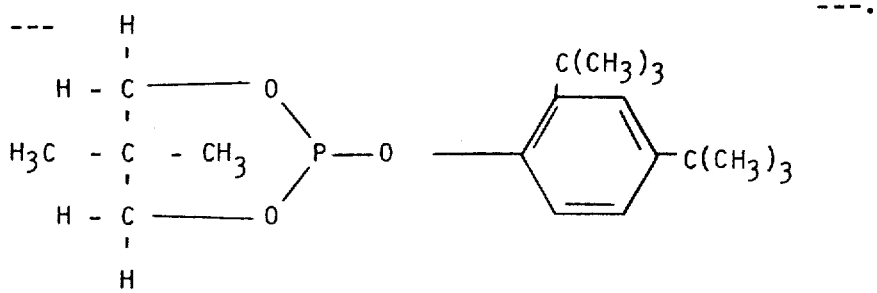

Claim 8, Column 9, line 28, delete "sleected" and insert --- selected ---.

SIGNED AND
SEALED
NOV 24 1970

(SEAL)
Attest:

Edward M. Fletcher, Jr.
Attesting Officer

WILLIAM E. SCHUYLER, JR.
Commissioner of Patents